Aug. 11, 1936.   L. R. HUFF   2,050,533
OILING DEVICE
Filed March 1, 1935

INVENTOR.
Leslie R. Huff
BY
HIS ATTORNEY.

Patented Aug. 11, 1936

2,050,533

UNITED STATES PATENT OFFICE 2,050,533

OILING DEVICE

Leslie R. Huff, Phillipsburg, N. J., assignor to Ingersoll-Rand Company, Jersey City, N. J., a corporation of New Jersey Application March 1, 1935, Serial No. 8,831

2 Claims. (Cl. 230—207)

This invention relates to oiling devices, and more particularly to an oiling device for rotary compressors, pumps and the like of the type employing slidable vanes.

One object of the invention is to assure an adequate supply of lubricant to the cooperating surfaces of the vanes and the elements wherewith the vanes contact.

Other objects will be in part obvious and in part pointed out hereinafter.

Figure 1:
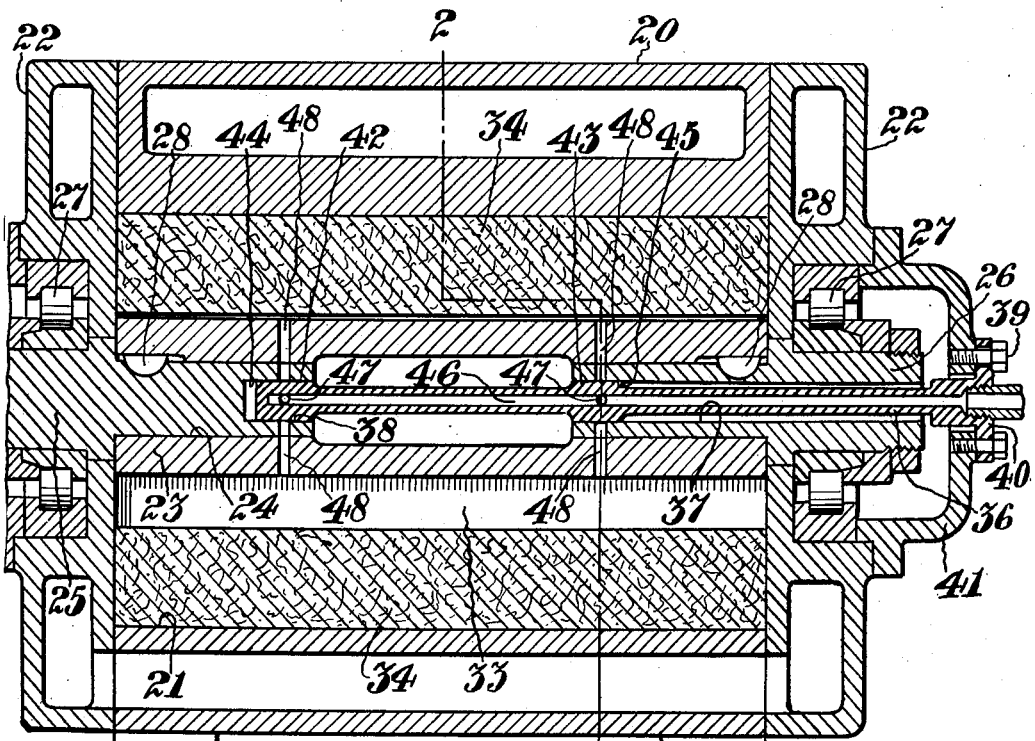
Figure 2:
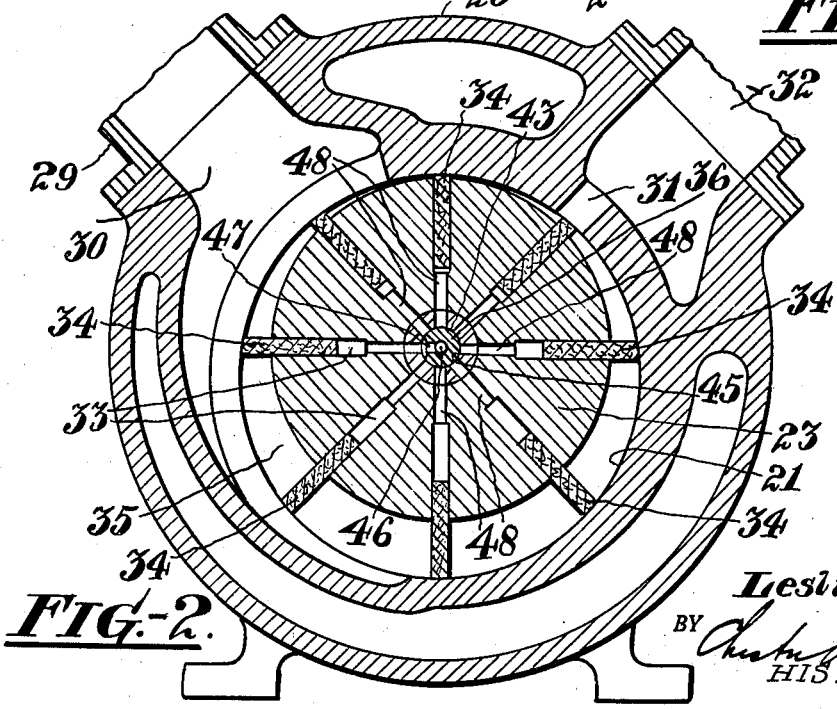

In the drawing accompanying this specification and in which similar reference numerals refer to similar parts, Figure 1 is a longitudinal elevation of a rotary compressor equipped with an oiling device constructed in accordance with the practice of the invention, and Figure 2 is a transverse view taken through Figure 1 on the line 2—2.

Referring more particularly to the drawing, 20 designates a casing bored to form a chamber 21 of which the ends are closed by heads 22 which may be secured to the casing 20 in any suitable manner.

Within the chamber 21 is a rotor 23 which is arranged eccentrically with respect to the chamber 21 and has an axial bore 24 into the ends of which are inserted trunnions or shafts 25 and 26. The shafts are journaled in anti-friction bearings 27 seated in the heads 22 and are secured to the rotor 23 by keys 28.

The fluid intended to be compressed may be conveyed to the compressor by suitable piping 29 connected to an inlet opening 30 in one side of the casing 20. In the opposite side of the casing is a discharge port 31 through which the fluid passes from the chamber 21 into a discharge conduit 32.

The rotor 23 is provided with a plurality of radial slots 33 containing vanes 34 which impel fluid from the inlet port 30 to the discharge port 31. The vanes 34 consist of thin strips of rigid material and are of only slightly less thickness than the slots so that they may slide freely therein and at the same time prevent undue leakage of fluid through the slots.

In accordance with the practice of the invention means are provided to maintain the surfaces of the vanes in a properly lubricated condition. To this end a tube 36 which may be connected to a source of oil supply is disposed in an axial bore 37 in the shaft 26 and extends into a bore 38 in the shaft 25. The tube 36 is a stationary member and may be thus held by bolts 39 extending through a flange 40 of the tube and threaded into a cover plate 41 overlying the adjacent anti-friction bearing 27. Preferably the tube 36 is provided at its free end with an enlarged or upset portion 42 and a similar portion 43 intermediate its ends to seat upon adjacent bearing surfaces 44 and 45 in the bores 38 and 37, respectively, to prevent undue vibratory movement of the tube.

The interior of the tube 36 constitutes a reservoir 46 for lubricant and in the wall of the tube, as for instance midway between the ends of the upset portions 42 and 43 are radial ports 47 which are directed toward the inlet opening 30 of the chamber 21. In the same transverse planes as the ports 47 and in the rotor 23 are passages 48 which open into the innermost ends of the slots 33 to convey lubricant from the reservoir 46 to the surfaces of the vanes 34 and the slots 33. The peripheral surfaces of the enlarged portions 42 and 43 are in sealing engagement with the bores 38 and 37 and seal all the passages 48 but that in immediate registry with the port 47.

From the foregoing description it will be apparent that during the operation of the rotor the passages 48 in the rotor move into registry with the passages 47 in the tube 36 and oil will then flow into the inner ends of the slots 33, whence it is distributed throughout slots by the vanes. By means of the present invention lubricant may be introduced into the slots 33 in substantially the correct quantities required to lubricate the vanes and without danger of introducing an excessive portion thereof into the compression chamber. It will, moreover, be obvious that by directing the outlet ports of the reservoir 46 toward the inlet port of the chamber 21 the pressure required for introducing the lubricant into the slots need be only slightly in excess of intake pressure.

I claim:

1. In an oiling device, the combination of a cylinder having intake and discharge ports and a rotor therein having a plurality of radial guide slots, vanes slidable in the slots, a stationary lubricant conveying tube in the rotor having a plurality of outlet ports directed only toward the intake side of the cylinder, said rotor having passages to register with the outlet ports for conveying lubricant into the guide slots.

2. In an oiling device, the combination of a cylinder having intake and discharge ports and a rotor therein having a plurality of radial guide slots, vanes slidable in the slots, stationary means extending into the rotor to form a reservoir for lubricant and having a plurality of outlet ports spaced along its length, said outlet ports being directed only toward the intake side of the cylinder, bearing surfaces in the rotor to support said means, said rotor having passages to register with the outlet ports for conveying lubricant into the guide slots, and means on the stationary means to seal all of the passages but those in registry with the outlet ports.

LESLIE R. HUFF.